(12) United States Patent
Kim et al.

(10) Patent No.: US 8,315,121 B2
(45) Date of Patent: Nov. 20, 2012

(54) INTERNAL POWER GENERATING APPARATUS, MULTICHANNEL MEMORY INCLUDING THE SAME, AND PROCESSING SYSTEM EMPLOYING THE MULTICHANNEL MEMORY

(75) Inventors: Jung-sik Kim, Seoul (KR); Ho-cheol Lee, Yongin-si (KR); Jang-woo Ryu, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 242 days.

(21) Appl. No.: 12/900,624

(22) Filed: Oct. 8, 2010

(65) Prior Publication Data

US 2011/0090754 A1 Apr. 21, 2011

(30) Foreign Application Priority Data

Oct. 16, 2009 (KR) .................. 10-2009-0098773

(51) Int. Cl.
*G11C 5/14* (2006.01)
(52) U.S. Cl. ............... 365/226; 365/189.07; 365/189.09
(58) Field of Classification Search .................. None
See application file for complete search history.

(56) References Cited

U.S. PATENT DOCUMENTS

| | | | | |
|---|---|---|---|---|
| 6,046,954 A * | 4/2000 | Yoon et al. | | 365/226 |
| 6,510,096 B2 * | 1/2003 | Choi et al. | | 365/226 |
| 7,342,837 B2 * | 3/2008 | Park | | 365/189.09 |
| 7,599,240 B2 * | 10/2009 | Shin et al. | | 365/226 |
| 7,656,736 B2 * | 2/2010 | Akiyama et al. | | 365/226 |
| 7,728,688 B2 * | 6/2010 | Shor | | 331/185 |

FOREIGN PATENT DOCUMENTS

| | | |
|---|---|---|
| JP | 11-297071 | 10/1999 |
| KR | 10-2000-0002450 A | 1/2000 |
| KR | 10-0813534 | 3/2008 |

* cited by examiner

*Primary Examiner* — Tan T. Nguyen
(74) *Attorney, Agent, or Firm* — Muir Patent Consulting, PLLC

(57) ABSTRACT

An internal power generating system for a semiconductor device is disclosed. The device may include a plurality of channels. The system comprises a reference voltage generator configured to generate a reference voltage. The system further comprises a plurality of internal power generators that are allocated to the plurality of channels in one-to-one correspondence and that are configured to commonly use the reference voltage generated by the reference voltage generator. Each internal power generator may be configured to receive a fed back internal power voltage, to compare the fed back internal power voltage to the reference voltage, and to generate an internal power voltage based on the comparison. The system further comprises a plurality of channel state detectors that are allocated to the plurality of channels in one-to-one correspondence, and that are configured to respectively detect operation states of the plurality of channels based on separate respective sets of command signals for each channel. The system additional comprises a plurality of internal power controllers that are allocated to the plurality of channels in one-to-one correspondence, and that are configured to respectively control driving capabilities for the internal power voltages according to the detected operation states.

20 Claims, 6 Drawing Sheets

INTERNAL POWER GENERATING APPARATUS, MULTICHANNEL MEMORY INCLUDING THE SAME, AND PROCESSING SYSTEM EMPLOYING THE MULTICHANNEL MEMORY

CROSS-REFERENCE TO RELATED APPLICATIONS

This application claims the benefit of Korean Patent Application No. 10-2009-0098773, filed on Oct. 16, 2009, in the Korean Intellectual Property Office, the disclosure of which is incorporated herein in its entirety by reference.

BACKGROUND

This application relates to a memory, and more particularly, to an internal power generating apparatus of a multichannel memory, a multichannel memory including the same, and a processing system employing the multichannel memory.

In general, in order to prevent voltage fluctuation that is generated when an external power voltage is provided, a memory includes an additional internal power generator so as to provide a power voltage to internal circuits. Internal power voltages used in a memory include various voltages such as a peripheral circuit voltage, a cell array voltage, a boosting voltage and a bit line voltage according to voltage levels used in peripheral and core blocks or according to voltage levels based on different uses. In order to obtain various voltage levels, various reference voltage generators are used.

SUMMARY

The disclosed embodiments provide an internal power generating apparatus of a multichannel memory.

The disclosed embodiments also provides a multichannel memory including the internal power generating apparatus.

Additional embodiments provide a processing system employing the multichannel memory.

In one embodiment, an internal power generating system for a semiconductor device is disclosed. The device may include a plurality of channels. The system comprises a reference voltage generator configured to generate a reference voltage. The system further comprises a plurality of internal power generators that are allocated to the plurality of channels in one-to-one correspondence and that are configured to commonly use the reference voltage generated by the reference voltage generator. Each internal power generator may be configured to receive a fed back internal power voltage, to compare the fed back internal power voltage to the reference voltage, and to generate an internal power voltage based on the comparison. The system further comprises a plurality of channel state detectors that are allocated to the plurality of channels in one-to-one correspondence, and that are configured to respectively detect operation states of the plurality of channels based on separate respective sets of command signals for each channel. The system additional comprises a plurality of internal power controllers that are allocated to the plurality of channels in one-to-one correspondence, and that are configured to respectively control driving capabilities for the internal power voltages according to the detected operation states.

In another embodiment, a multichannel memory is disclosed. The memory comprises a plurality of memory regions comprising a plurality of respective channels, wherein each of the plurality of channels includes a set of dedicated input/output (I/O) port. The memory further includes a reference voltage generator configured to generate a reference voltage, and a plurality of internal power units that commonly use the reference voltage generated by the reference voltage generator, and are respectively configured to provide power voltages to the respective plurality of memory regions. The plurality of internal power units may respectively comprise a plurality of internal power generators that are allocated to the plurality of channels in one-to-one correspondence and that are configured to commonly use the reference voltage generated by the reference voltage generator and to generate an internal power voltages, a plurality of channel state detectors that are allocated to the plurality of channels in one-to-one correspondence, and that are configured to respectively detect operation states of the plurality of channels based on separate respective sets of command signals, and a plurality of internal power controllers that are allocated to the plurality of channels in one-to-one correspondence, and that are configured to respectively control driving capabilities for the internal power voltages according to the detected operation states.

In a further embodiment, a processing system is disclosed. The processing system includes a processor, a multichannel memory that reads and writes data according to commands of the processor, and an input/output (I/O) device that inputs/outputs data stored in the multichannel memory. The multichannel memory may comprise a plurality of channel memories that have independent I/O ports and perform independent commands with respect to a plurality of channels, a reference voltage generator that generates a reference voltage by using an external power voltage, and a plurality of internal power units that commonly use the reference voltage generated by the reference voltage generator and respectively provide power voltages to the plurality of channel memories. The plurality of internal power units may respectively comprise: a plurality of internal power generators that are allocated to the plurality of channels in one-to-one correspondence and that are configured to commonly use the reference voltage generated by the reference voltage generator, each internal power generator configured to receive a fed back internal power voltage, to compare the fed back internal power voltages to the reference voltage, and to generate an internal power voltage based on the comparison; a plurality of channel state detectors that are allocated to the plurality of channels in one-to-one correspondence, and that are configured to respectively detect operation states of the plurality of channels based on separate sets of signals received for each channel; and a plurality of internal power controllers that are allocated to the plurality of channels in one-to-one correspondence, and that are configured to respectively control driving capabilities for the internal power voltages according to the detected operation states.

In another embodiment, an internal power generating apparatus of a semiconductor memory including a plurality of channels is disclosed. The apparatus comprises a reference voltage generator configured to generate a reference voltage based on an external power voltage. The apparatus further comprises a plurality of internal power generators that are allocated to the plurality of channels in one-to-one correspondence and that are configured to commonly use the reference voltage generated by the reference voltage generator. Each internal power generator may be configured to receive a fed back internal input power voltage, to compare the internal power voltage to the reference voltage, and to generate an internal power voltage based on the comparison. The apparatus further comprises a plurality of sets of command signals, each set configured to be used to determine the operation state of one of the plurality channels, and a plurality of power controllers corresponding to the plurality of internal power generators, each power controller configured to control a driving capability of its corresponding internal power generator based on the determined operational state of a corresponding channel.

In another embodiment, a multichannel memory is disclosed. The memory comprises multichannel memory units that include sets of independent input/output (I/O) ports and are configured to perform independent commands with respect to a plurality of channels, and an internal power provider configured to provide a power voltage to each of the multichannel memory units. The internal power provider may comprise a reference voltage generator configured to generate a reference voltage by using an external power voltage and configured such that the reference voltage is commonly used in the plurality of channels, and a plurality of internal power generators that are allocated to the plurality of channels in one-to-one correspondence, and that are configured to commonly use the reference voltage generated by the reference voltage generator. Each internal power generator may be configured to receive a fed back internal input power voltage, compare the fed back internal power voltage to the reference voltage, and generate an internal power voltage based on the comparison. The power available for the internal power voltage for each internal power generator may depend on the independent commands received by the channel corresponding to the internal power generator In yet another embodiment, a method of supplying power to a plurality of memory regions of a semiconductor device including a plurality of channels is disclosed. The method includes supplying an internal power voltage to each of the plurality of memory regions. Each of the plurality of memory regions may correspond to a respective channel of the plurality of channels. The method further includes separately detecting the operation state of each of the plurality of channels based on a set of command signals received by the channel. For each of the memory regions, the method additionally includes controlling a driving capability for the internal power voltage based on the detected operation state of the channel that corresponds to the memory region.

BRIEF DESCRIPTION OF THE DRAWINGS

Exemplary embodiments will be more clearly understood from the following detailed description taken in conjunction with the accompanying drawings in which.

DETAILED DESCRIPTION

Figure 1:
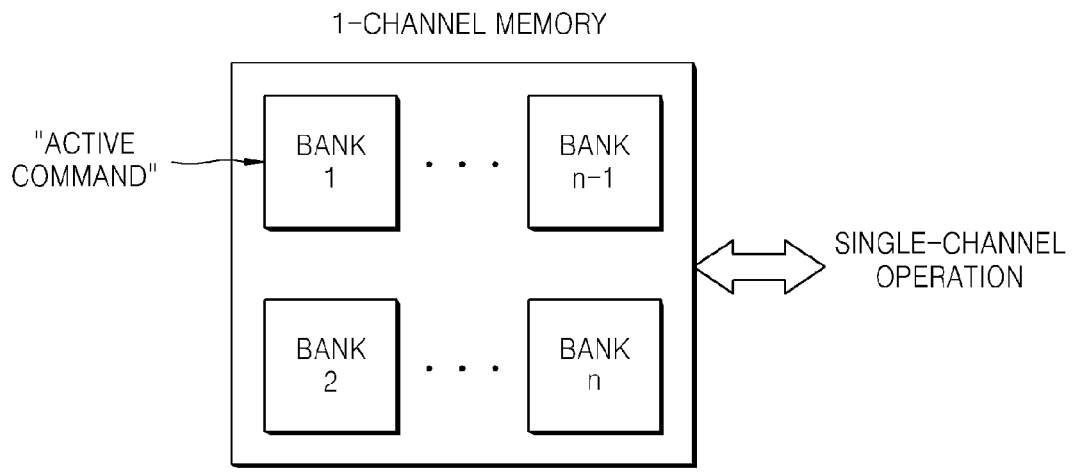
FIG. 1 is a block diagram of an example of a single-channel memory.

Various embodiments now will be described more fully hereinafter with reference to the accompanying drawings. However, the disclosed embodiments may be embodied in many different forms and should not be construed as limited to the embodiments set forth herein. Rather, these embodiments are provided so that this disclosure will be thorough and complete, and will fully convey the scope of the methods and systems disclosed herein to those skilled in the art. In the drawings, the size and relative sizes of elements and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to limit the scope of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an example of a single-channel memory.

Referring to FIG. 1, the single-channel memory includes first through nth memory banks and performs one operation at a time, e.g., an active command through one set of input/output (I/O) ports.

Figure 2:
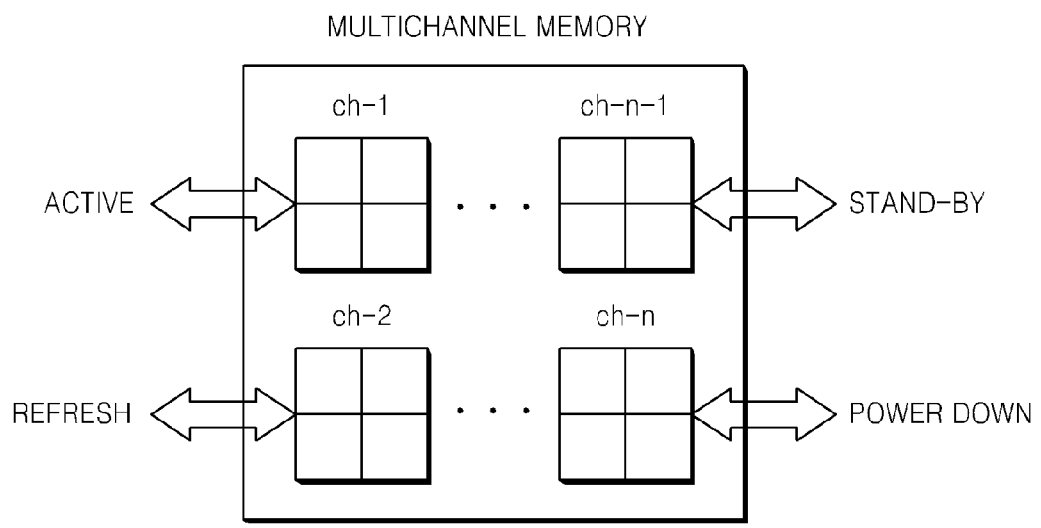
FIG. 2 is a block diagram of an example of a multichannel memory.

FIG. 2 is a block diagram of an example of a multichannel memory.

Referring to FIG. 2, the multichannel memory includes first through nth channels Ch-1 through Ch-n that include separate, independent memory regions so as to perform separate, independent commands. For example, the first channel Ch-1 may operate in an active state, while the second channel Ch-2 performs a refresh operation, the n−1th channel Ch-n−1 is in a stand-by state, and the nth channel Ch-n is in a power down state.

In general, when an operation is performed in a 1-channel memory, each internal power generator receives feedback on a power level in a memory chip according to the operation and determines whether to provide a power voltage. However, in a memory having multiple channels for performing independent operations, a power level of a memory region of each channel according to the operation may be different and thus a different internal power providing method would be beneficial.

Figure 3:
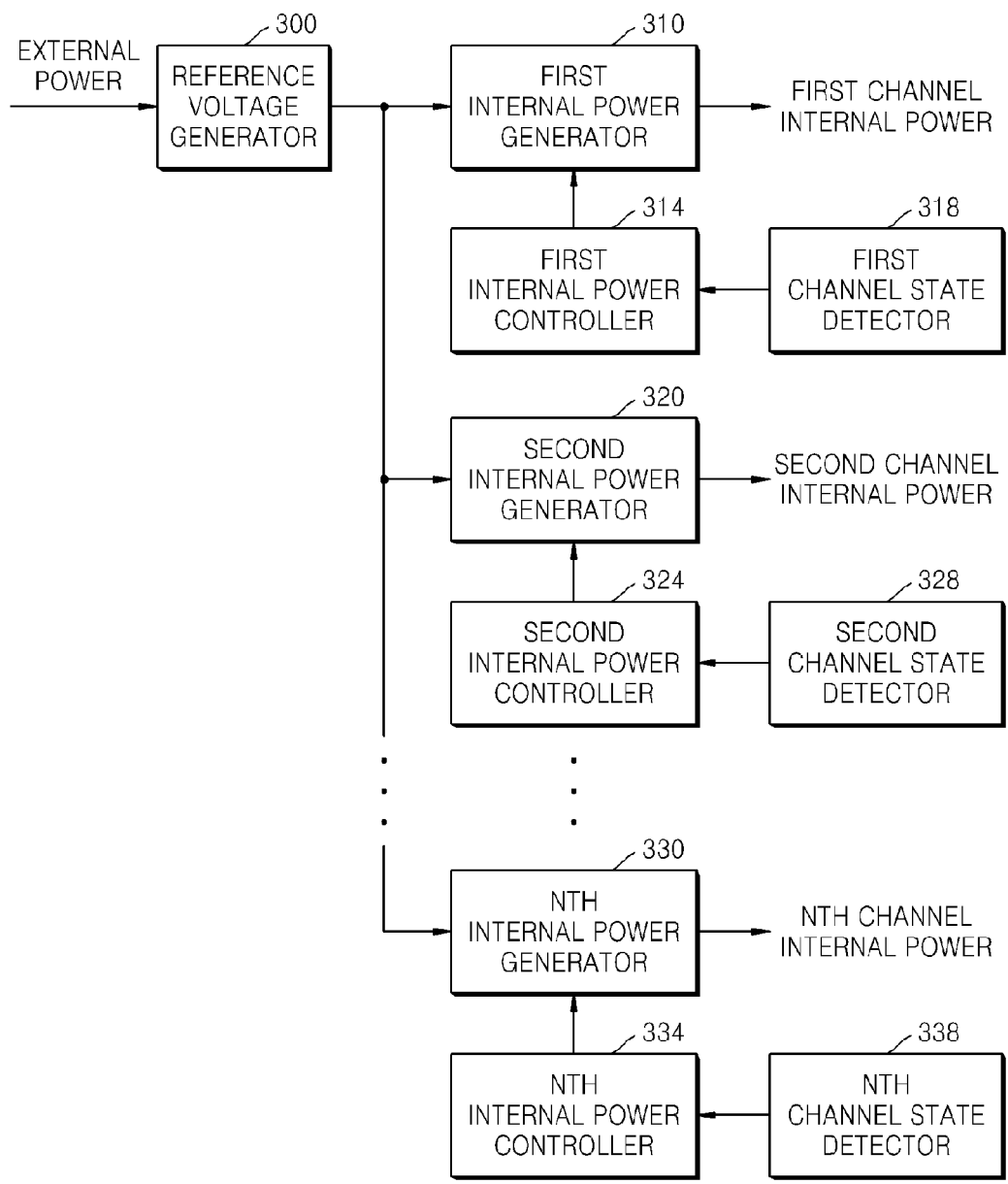
FIG. 3 is a block diagram of an internal power generating system and apparatus for a multichannel memory, according to an exemplary embodiment.

FIG. 3 is a block diagram of an internal power generating system and apparatus for a multichannel memory, according to an exemplary embodiment.

Referring to FIG. 3, the internal power generating system and apparatus according to one embodiment includes a reference voltage generator 300 and first through nth internal power generators 310, 320 and 330. The internal power generating system and apparatus may further include first through nth internal power controllers 314, 324 and 334 and first through nth channel state detectors 318, 328 and 338.

The internal power generating system may be used in a semiconductor device, such as a semiconductor memory that includes a plurality of memory regions that correspond to a plurality of respective channels. Each channel may include a set of power and I/O signals (e.g., command and data signals) sent via power and I/O ports to the memory region in order to allow for proper operation. In one embodiment, each channel includes one or more dedicated I/O signals that are dedicated only to the memory region corresponding that channel, and each channel may also include one or more shared I/O signals that are shared with other memory regions. As such, each channel includes a set of I/O signals or ports that are dedicated to a particular memory region, so that a plurality of channels include independent I/O ports and are configured to perform independent commands.

The reference voltage generator 300 generates a reference voltage by using an external power voltage. In one embodiment, the reference voltage is commonly used in different channels for the first through nth internal power generators 310, 320 and 330.

In one embodiment, the first through nth internal power generators 310, 320 and 330 are allocated to the channels in one-to-one correspondence, and commonly use the reference voltage generated by the reference voltage generator 300. An internal power voltage of each channel is generated by receiving feedback on internal power voltages used in the channels and comparing the internal power voltages to the reference voltage.

In one embodiment, the first through nth channel state detectors 318, 328 and 338 are allocated to the channels in one-to-one correspondence, and correspondingly detect operation states of the channel.

The first through nth internal power controllers 314, 324 and 334 may also be allocated to the channels in one-to-one correspondence, and respectively control driving capabilities (i.e., power available) for the first through nth internal power generators 310, 320 and 330 and/or whether to operate the first through nth internal power generators 310, 320 and 330 according to the operation states detected by the first through nth channel state detectors 318, 328 and 338.

In one embodiment, the first through nth internal power controllers 314, 324 and 334 may operate in a dependent manner. For example, if the operation state of one of the channels is detected as a predetermined operation state, driving capabilities of the internal power voltages may be controlled according to the predetermined operation state with respect to all of the channels. Thus, if the first channel state detector 318 detects an active state from a first channel, the first internal power controller 314 controls the power capability of the first internal power generator 310 to correspond to the active state. In this case, with respect to the other channels, i.e., second through nth channels, like the first internal power controller 314, the second through nth internal power controllers 324 through 334 respectively control the power capabilities of the second through nth internal power generators 320 and 330 to correspond to the active state.

In another embodiment, however, the first through nth internal power controllers 314, 324, and 334 operate in an independent manner, such that each controller controls the driving capabilities of its corresponding internal power generator based on the state of its corresponding channel, and regardless of the state of other channels. In yet another embodiment, certain power controllers can depend on some power controllers, but not others, such that internal power controller dependencies can be grouped together in different ways.

Figure 4:
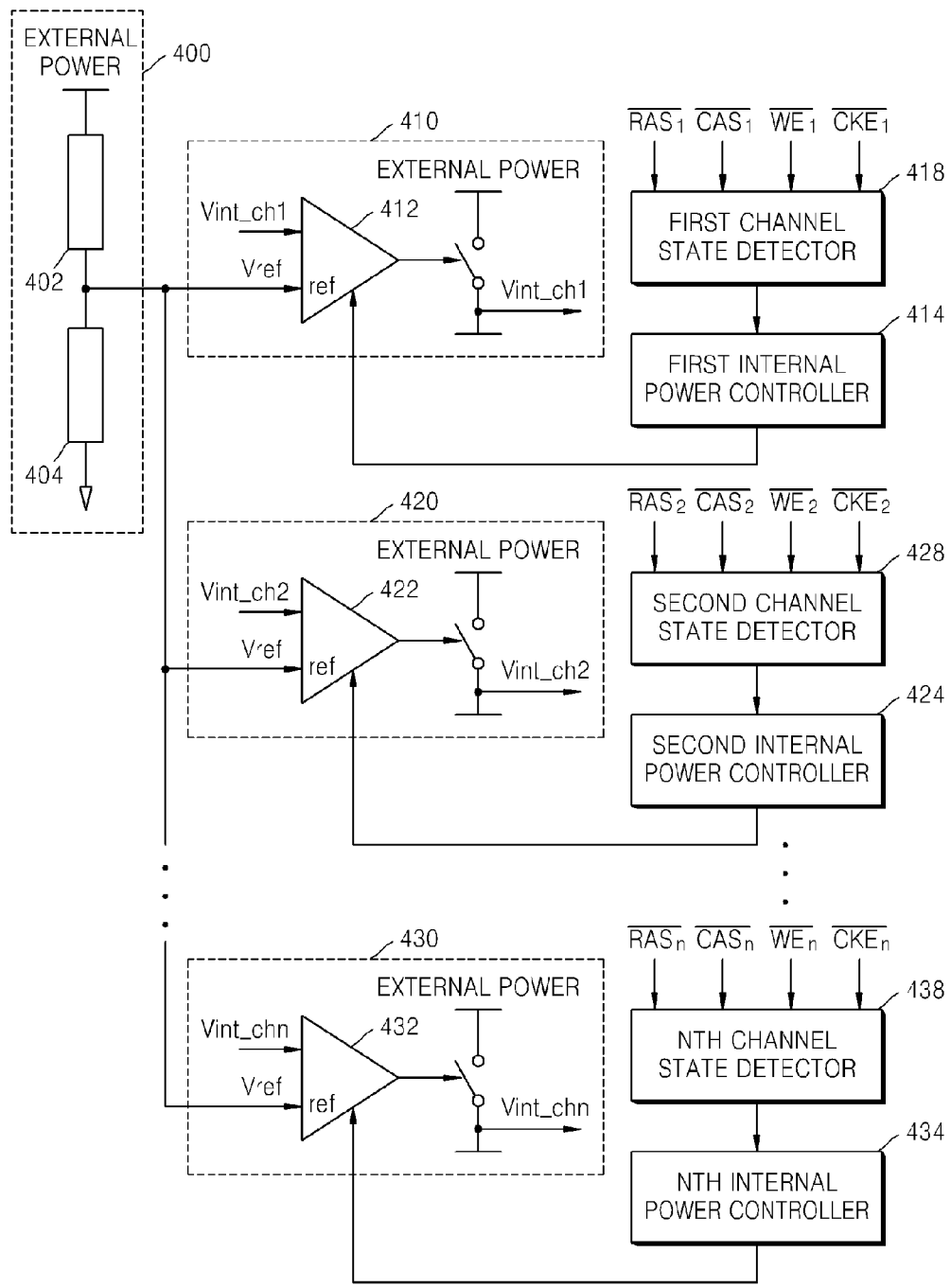
FIG. 4 is a detailed block diagram of the internal power generating system and apparatus illustrated in FIG. 3, according to one embodiment.

FIG. 4 is a detailed block diagram of the internal power generating system and apparatus illustrated in FIG. 3, according to one embodiment.

Referring to FIG. 4, a reference voltage generator 400, first through nth internal power generators 410, 420 and 430, first through nth internal power controllers 414, 424 and 434, and first through nth channel state detectors 418, 428 and 438 respectively correspond to the reference voltage generator 300, the first through nth internal power generators 310, 320 and 330, the first through nth internal power controllers 314, 324 and 334, and the first through nth channel state detectors 318, 328 and 338 illustrated in FIG. 3.

In one embodiment, when a reference voltage is generated by using an external power voltage, the reference voltage generator 400 may generate the reference voltage by dividing the external power voltage by using resistors or/and transistors 402 and 404. Internal power voltages are referred to herein generally as Vint. Internal power voltages using the reference voltage in, for example, a dynamic random access memory (DRAM), may include, for example, a peripheral circuit voltage VINT, a cell array voltage VINTA, a boosting voltage VPP and a bit line voltage VBL which are used as internal power voltages Vint of a multichannel memory.

The reference voltage generator 400 and the first through nth internal power generators 410, 420 and 430 may respectively correspond to the reference voltage and the internal power voltages in one-to-one correspondence.

In one embodiment, the first through nth internal power generators 410, 420 and 430 commonly use a reference voltage Vref output from the reference voltage generator 400, and respectively receive feedback on first through nth internal power voltages Vint_ch1 through Vint_chn of a plurality of channels, compare the first through nth internal power voltages Vint_ch1 through Vint_chn to the reference voltage Vref in first through nth comparators 412, 422 and 432, and generate the first through nth internal power voltages Vint_ch1 through Vint_chn based on the comparison.

As illustrated in FIG. 4, the first through nth internal power generators 410, 420 and 430 respectively include circuits for comparing the reference voltage Vref to the fed back first through nth internal power voltages Vint_ch1, Vint_ch2 and Vint_chn in order to output first through nth internal power voltages based on the comparison.

The first through nth channel state detectors 418, 428 and 438 respectively detect operation states of the channels by using allocated control signals, for example, a row address strobe (RAS) signal, a column address strobe (CAS) signal, a chip selection (CS) signal, a write enable (WE) signal and a clock enable (CKE) signal in a DRAM. The operation states in, for example, a DRAM may include an active state, an auto refresh state, a self refresh state, a read state, a write state, a precharge state, an active power down state, a precharge power down state and a deep power down state. For example, as shown in Table 1, the operation states of the channels may be determined according to the states of one or more command signals (e.g., the CKE signal, the CS signal, the RAS signal, the CAS signal and the WE signal). In Table 1, the CKE signal, the CS signal, the RAS signal, the CAS signal and the WE signal are active low signals, H represents a logic high level, L represents a logic low level, and X represents "Don't Care".

TABLE 1

|  | CKE | CS | RAS | CAS | WE |
|---|---|---|---|---|---|
| Auto Refresh | H | L | L | L | H |
| Self Refresh | L | L | L | L | H |
| Read | X | L | H | L | H |
| Write | X | L | H | L | L |
| Precharge | X | L | L | H | L |
| Active Power Down | L | H | X | X | X |
| Precharge Power Down | L | H | X | X | X |

In one embodiment, different sets of command signals are used by different state detectors to detect the state of a channel associated with the set of command signals (e.g., RAS1, CAS1, WE1, and CKE1 are different from RAS2, CAS2, WE2, and CKE2). The first through nth internal power controllers 414, 424 and 434 may respectively control power capabilities of the first through nth internal power generators 410, 420 and 430 according to the detected operation states so as to control the magnitudes of currents to be output.

Figure 5:
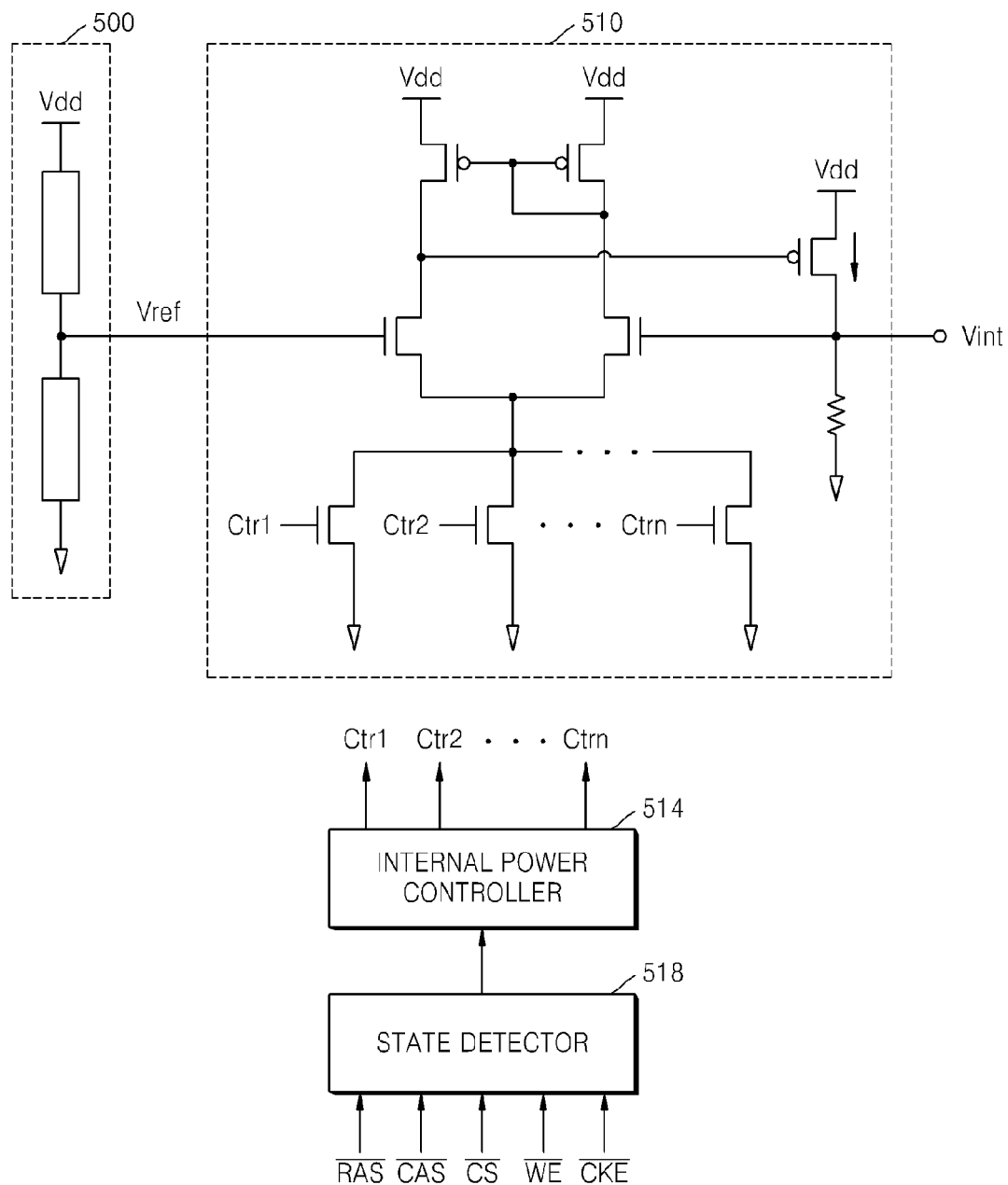
FIG. 5 is a detailed diagram of a reference voltage generator, a first internal power generator, a first internal power controller and a first channel state detector of the internal power generating apparatus illustrated in FIG. 4, according to one embodiment.

FIG. 5 is a detailed diagram of the reference voltage generator 400, the first internal power generator 410, the first internal power controller 414 and the first channel state detector 418 illustrated in FIG. 4, according to one embodiment.

Referring to FIG. 5, a reference voltage generator 500, a state detector 518, an internal power generator 510 and an internal power controller 514 respectively correspond to the reference voltage generator 400, the first channel state detector 418, the first internal power generator 410 and the first internal power controller 414 illustrated in FIG. 4.

In the internal power generator 510, an internal power voltage Vint is controlled according to first through nth control signals Ctr1 through Ctrn generated by the internal power controller 514. For example, the intensity of a driving current may be controlled to be large in an active state and may be controlled to be small in a precharge state.

The first through nth control signals Ctr1 through Ctrn generated by the internal power controller 514 are selectively activated according to operation states detected by the state detector 518. For example, in an active state, in order to make the magnitude of the driving current large, all of the first through nth control signals Ctr1 through Ctrn may be activated. In a precharge state, in order to make the magnitude of the driving current small, a majority (e.g., all but one) of the first through nth control signals Ctr1 through Ctrn may be deactivated. In this manner, in a power down state and a refresh state detected by the state detector 518, the first through nth control signals Ctr1 through Ctrn may be correspondingly and selectively activated.

Figure 6:
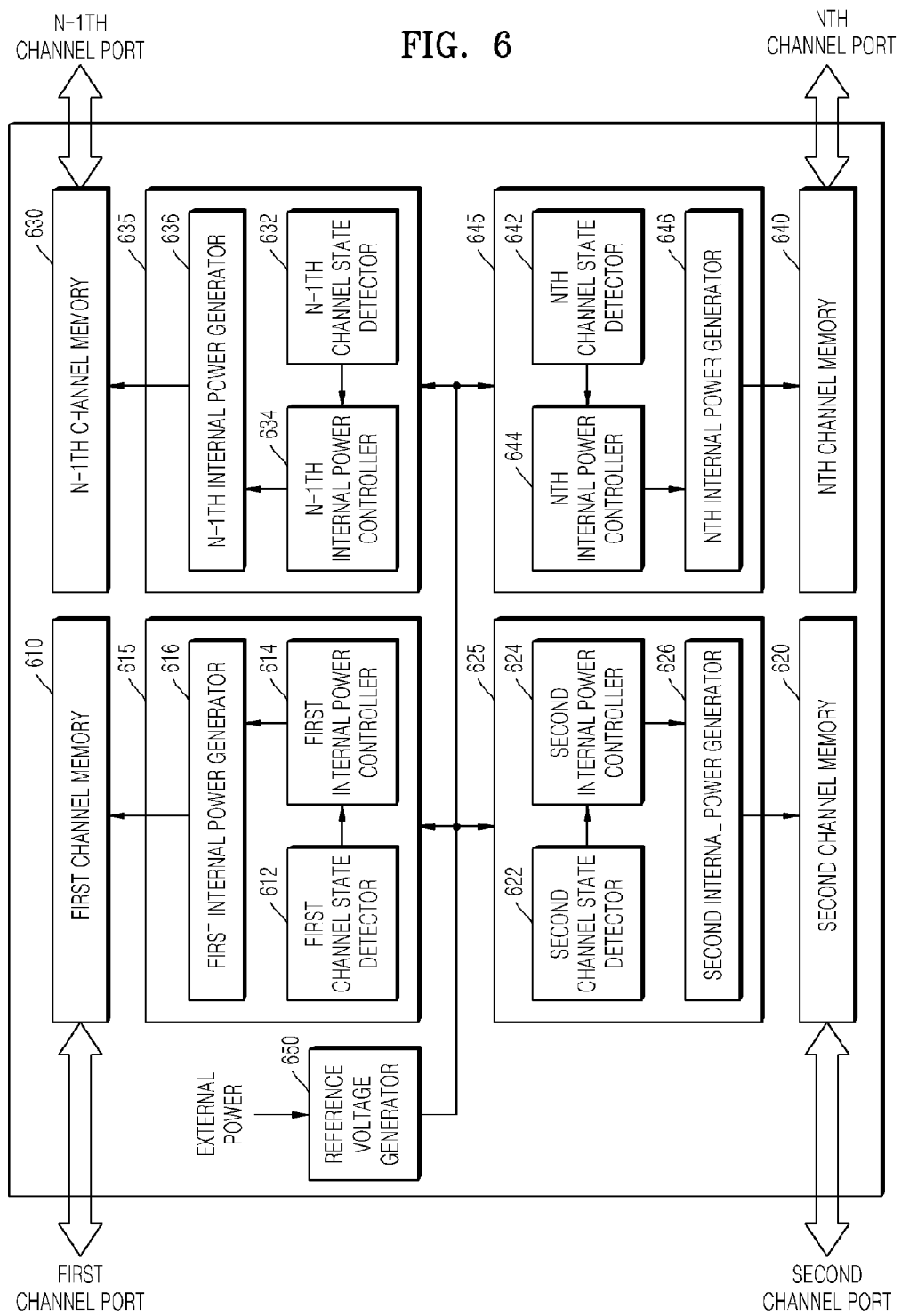
FIG. 6 is a block diagram of a multichannel memory employing the internal power generating system and apparatus illustrated in FIG. 3, according to an exemplary embodiment.

FIG. 6 is a block diagram of a multichannel memory employing the internal power generating system and apparatus illustrated in FIG. 3, according to one exemplary embodiment.

Referring to FIG. 6, the multichannel memory includes first through nth channel memories 610, 620, 630 and 640, a reference voltage generator 650 and first through nth internal power units 615, 625, 635 and 645. The first through nth channel memories 610, 620, 630 and 640 respectively include a plurality of channels, and each of the plurality of channels has its own I/O ports (a first port, a second port, an n−1th port and an nth port) and performs one or more independent commands with respect to the plurality of channels. The reference voltage generator 650 generates a reference voltage by using an external power voltage. The first through nth internal power units 615, 625, 635 and 645 respectively provide internal power voltages to the first through nth channel memories 610, 620, 630 and 640 by commonly using the reference voltage output from the reference voltage generator 650. The first through nth internal power units 615, 625, 635 and 645 respectively include first through nth internal power generators 616, 626, 636 and 646, first through nth internal power controllers 614, 624, 634 and 644, and first through nth channel state detectors 612, 622, 632 and 642. Functions of the first through nth internal power generators 616, 626, 636 and 646, the first through nth internal power controllers 614, 624, 634 and 644, and the first through nth channel state detectors 612, 622, 632 and 642 correspond respectively to those of the first through nth internal power generators 310, 320 and 330, the first through nth internal power controllers 314, 324 and 334, and the first through nth channel state detectors 318, 328 and 338 illustrated in FIG. 3, and correspond respectively to those of the first through nth internal power generators 410, 420 and 430, the first through nth internal power controllers 414, 424 and 434, and the first through nth channel state detectors 418, 428 and 438 illustrated in FIG. 4. Thus, detailed descriptions thereof will not be provided here.

Figure 7:
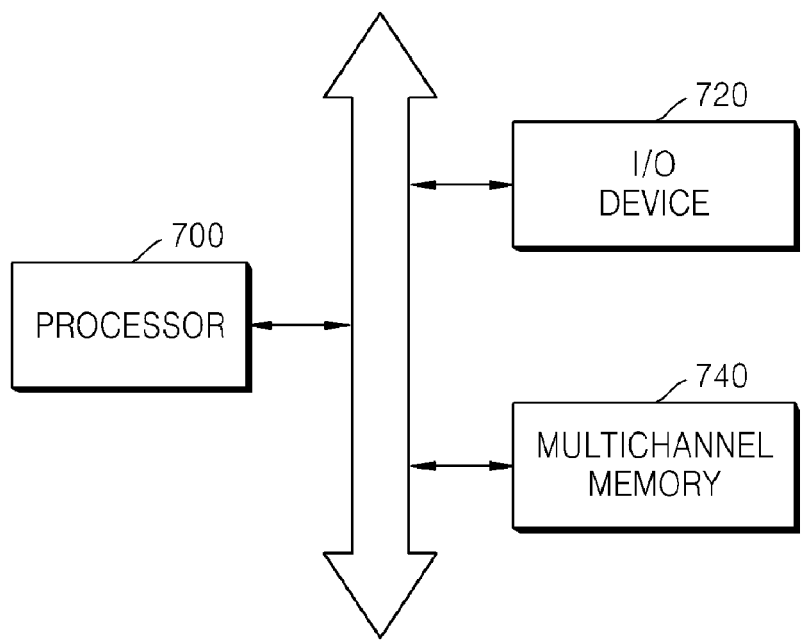
FIG. 7 is a block diagram of a processing system employing the multichannel memory illustrated in FIG. 6, according to one embodiment.

FIG. 7 is a block diagram of a processing system employing the multichannel memory illustrated in FIG. 6, according to one embodiment.

Referring to FIG. 7, the processing system according to the one embodiment includes a processor 700, an I/O device 720 and a multichannel memory 740.

The processor 700 may be a general microprocessor that processes data. The I/O device 720 may be a general I/O device that inputs/outputs data stored in the multichannel memory 740. The multichannel memory 740 reads and writes data according to a command of the processor 700 and may have a structure and functions that are the same as those of the multichannel memory illustrated in FIG. 6.

The processing system is a system using a multichannel memory and may include a computer, a portable terminal, a home appliance, a cell phone or other information distribution device, and the like. In addition, although the embodiments discussed above describe using the internal power generating system for a multichannel memory, the internal power generating system discussed herein may be used for other systems that supply power to multiple channels, such as microprocessor systems or other integrated circuit systems. Furthermore, the internal power generating system described above need not be used for an entire system (e.g., an entire multichannel memory). In some embodiments, it may be used to provide power to a portion of a multichannel memory or a portion of another system, for example, to certain channels of a multichannel memory.

Figure 8:
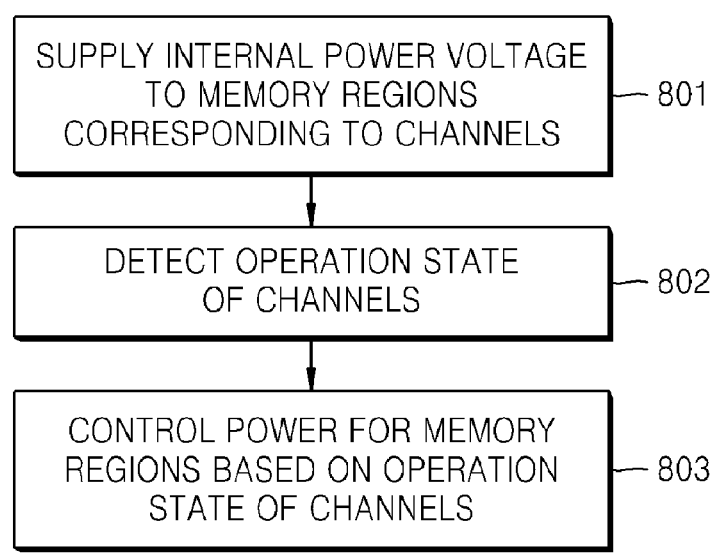
FIG. 8 is a flow chart showing an exemplary method of supplying power to a plurality of memory regions of a semiconductor device, according to certain disclosed embodiments.

The systems described in FIGS. 3-7 provide for a method for supplying power to regions of a semiconductor device. In one embodiment, as depicted in FIG. 8, they provide for a method of supplying power to a plurality of memory regions of a semiconductor device including a plurality of channels. As shown in FIG. 8, the method includes supplying internal power voltage to memory regions corresponding to channels (step 801). For example, the method may include supplying an internal power voltage to each of the plurality of memory regions, wherein each of the plurality of memory regions corresponds to a respective channel of the plurality of channels. The method further includes detecting the operation state of each of the plurality of channels (step 802), and for each of the memory regions, controlling the driving capability for the internal power voltage based on the detected operation state of the channel that corresponds to the memory region (step 803).

While the above descriptions have been particularly shown and described with reference to exemplary embodiments, it will be understood that various changes in form and details may be made therein without departing from the spirit and scope of the following claims.

What is claimed is:

1. An internal power generating system for a semiconductor device including a plurality of channels, the system comprising:
   a reference voltage generator configured to generate a reference voltage;
   a plurality of internal power generators that are allocated to the plurality of channels in one-to-one correspondence and that are configured to commonly use the reference voltage generated by the reference voltage generator, each internal power generator configured to receive a fed back internal power voltage, to compare the fed back internal power voltage to the reference voltage, and to generate an internal power voltage based on the comparison;
   a plurality of channel state detectors that are allocated to the plurality of channels in one-to-one correspondence, and that are configured to respectively detect operation states of the plurality of channels based on separate respective sets of command signals for each channel; and
   a plurality of internal power controllers that are allocated to the plurality of channels in one-to-one correspondence, and that are configured to respectively control driving capabilities for the internal power voltages according to the detected operation states.

2. The system of claim 1, wherein the plurality of channels are allocated to a plurality of respective corresponding regions of the semiconductor device.

3. The system of claim 1, wherein the system is configured so that when different channels have different states, the corresponding state detectors and internal power controllers for the different channels control the driving capability for the corresponding internal power voltages based on the different states.

4. The system of claim 1, wherein the plurality of channel state detectors are configured to respectively detect the operation states of the plurality of channels by using external control signals respectively allocated to the plurality of channels.

5. The system of claim 1, wherein the plurality of internal power controllers are configured to respectively control driving currents of the plurality of internal power generators, and magnitudes of currents to be output, according to the detected operation states.

6. The system of claim 1, wherein, the system is further configured so that if the operation state of one of the plurality of channels is detected as a predetermined operation state, the plurality of internal power controllers respectively control the driving capabilities of the internal power voltages according to the predetermined operation state for all of the plurality of channels.

7. The system of claim 1, wherein the semiconductor device includes a memory and wherein at least one of the internal power voltages is a peripheral circuit voltage, a cell array voltage, a boosting voltage or a bit line voltage.

8. The apparatus of claim 1, wherein the plurality of internal power generators respectively comprise circuits for comparing the reference voltage to the fed back internal power voltages.

9. The apparatus of claim 1, wherein each of the plurality of channels has its own input/output (I/O) ports different from input/output (I/O) ports of other of the plurality of channels.

10. A multichannel memory comprising:
    a plurality of memory regions comprising a plurality of respective channels, wherein each of the plurality of channels includes a set of dedicated input/output (I/O) ports;
    a reference voltage generator configured to generate a reference voltage; and
    a plurality of internal power units that commonly use the reference voltage generated by the reference voltage generator, and are respectively configured to provide power voltages to the respective plurality of memory regions,
    wherein the plurality of internal power units respectively comprise:
    a plurality of internal power generators that are allocated to the plurality of channels in one-to-one correspondence and that are configured to commonly use the reference voltage generated by the reference voltage generator and to generate an internal power voltages;
    a plurality of channel state detectors that are allocated to the plurality of channels in one-to-one correspondence, and that are configured to respectively detect operation states of the plurality of channels based on separate respective sets of command signals; and
    a plurality of internal power controllers that are allocated to the plurality of channels in one-to-one correspondence, and that are configured to respectively control driving capabilities for the internal power voltages according to the detected operation states.

11. A processing system comprising:
    a processor;
    a multichannel memory that reads and writes data according to commands of the processor; and
    an input/output (I/O) device that inputs/outputs data stored in the multichannel memory,
    wherein the multichannel memory comprises:
    a plurality of channel memories that have independent I/O ports and perform independent commands with respect to a plurality of channels;
    a reference voltage generator that generates a reference voltage by using an external power voltage; and
    a plurality of internal power units that commonly use the reference voltage generated by the reference voltage generator and respectively provide power voltages to the plurality of channel memories, wherein the plurality of internal power units respectively comprise:
a plurality of internal power generators that are allocated to the plurality of channels in one-to-one correspondence and that are configured to commonly use the reference voltage generated by the reference voltage generator, each internal power generator configured to receive a fed back internal power voltage, to compare the fed back internal power voltages to the reference voltage, and to generate an internal power voltage based on the comparison;
a plurality of channel state detectors that are allocated to the plurality of channels in one-to-one correspondence, and that are configured to respectively detect operation states of the plurality of channels based on separate sets of signals received for each channel; and
a plurality of internal power controllers that are allocated to the plurality of channels in one-to-one correspondence, and that are configured to respectively control driving capabilities for the internal power voltages according to the detected operation states.

12. An internal power generating apparatus of a semiconductor memory including a plurality of channels, the apparatus comprising:
a reference voltage generator configured to generate a reference voltage based on an external power voltage; and
a plurality of internal power generators that are allocated to the plurality of channels in one-to-one correspondence and that are configured to commonly use the reference voltage generated by the reference voltage generator, each internal power generator configured to receive a fed back internal input power voltage, to compare the internal power voltage to the reference voltage, and to generate an internal power voltage based on the comparison;
a plurality of sets of command signals, each set configured to be used to determine the operation state of one of the plurality channels; and
a plurality of power controllers corresponding to the plurality of internal power generators, each power controller configured to control a driving capability of its corresponding internal power generator based on the determined operational state of a corresponding channel.

13. The apparatus of claim 12, wherein at least two different internal power generators are controlled to have two different driving capabilities for the internal power voltages.

14. The apparatus of claim 13, wherein the apparatus is further configured to cause the two different driving capabilities to be determined based on different received control signals.

15. The apparatus of claim 12, wherein the plurality of internal power generators respectively comprise circuits for comparing the reference voltage to the fed back internal power voltages.

16. A multichannel memory comprising:
multichannel memory units that include sets of independent input/output (I/O) ports and are configured to perform independent commands with respect to a plurality of channels; and
an internal power provider configured to provide a power voltage to each of the multichannel memory units, wherein the internal power provider comprises:
a reference voltage generator configured to generate a reference voltage by using an external power voltage and configured such that the reference voltage is commonly used in the plurality of channels; and
a plurality of internal power generators that are allocated to the plurality of channels in one-to-one correspondence, and that are configured to commonly use the reference voltage generated by the reference voltage generator, wherein each internal power generator is configured to receive a fed back internal input power voltage, compare the fed back internal power voltage to the reference voltage, and generate an internal power voltage based on the comparison,
wherein the power available for the internal power voltage for each internal power generator depends on the independent commands received by the channel corresponding to the internal power generator.

17. A method of supplying power to a plurality of memory regions of a semiconductor device including a plurality of channels, the method comprising:
supplying an internal power voltage to each of the plurality of memory regions, each of the plurality of memory regions corresponding to a respective channel of the plurality of channels;
separately detecting the operation state of each of the plurality of channels based on a set of command signals received by the channel; and
for each of the memory regions, controlling a driving capability for the internal power voltage based on the detected operation state of the channel that corresponds to the memory region.

18. The method of claim 17, further comprising:
detecting the operation state of each of the plurality of channels based on a set of independent command signals received by that channel.

19. The method of claim 18, further comprising:
receiving two different sets of command signals at two different corresponding channels; and
based on the two different sets of command signals:
detecting a first operation state of a first channel of the different corresponding channels,
detecting a second operation state of the second channel of the different corresponding channels, wherein the second operation state is different from the first operation state, and
based on the detecting of the first and second operation states, controlling the driving capabilities for a first and second internal power voltage corresponding to the two different channels differently.

20. The method of claim 18, further comprising:
when the operation state of one of the plurality of channels is determined to be the active state, controlling the power available for the internal power voltage for that channel so that the driving current for that channel has a first magnitude; and
when the operation state of one of the plurality of channels is determined to be a state other than the active state, controlling the power available for the internal power voltage for that channel so that the driving current for that channel has a second magnitude lower than the first magnitude.

* * * * *